(12) United States Patent
Kamocsai et al.

(10) Patent No.: US 9,116,290 B1
(45) Date of Patent: Aug. 25, 2015

(54) FACETED, GERMANIUM SLOTTED WAVEGUIDE

(71) Applicant: BAE Systems Information and Electronic Systems Integration Inc., Nashua, NH (US)

(72) Inventors: Robert L. Kamocsai, Manassas, VA (US); Vu A. Vu, Falls Church, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/647,128

(22) Filed: Oct. 8, 2012

Related U.S. Application Data

(60) Provisional application No. 61/544,335, filed on Oct. 7, 2011.

(51) Int. Cl.
*G02B 6/12* (2006.01)
*G02B 6/10* (2006.01)
*G02F 2/02* (2006.01)

(52) U.S. Cl.
CPC ..................................... *G02B 6/12* (2013.01)

(58) Field of Classification Search
CPC ...... G02B 6/00; G02B 27/142; G02B 27/149; G02B 6/12; G02B 6/26; G02B 6/10
USPC .......................................................... 385/14
See application file for complete search history.

(56) References Cited

U.S. PATENT DOCUMENTS

| | | | | |
|---|---|---|---|---|
| 3,831,115 A * | 8/1974 | Coldren | .......................... | 333/150 |
| 4,466,696 A * | 8/1984 | Carney | ............................ | 385/49 |
| 5,260,587 A * | 11/1993 | Sato | ................................ | 257/88 |
| 5,980,831 A | 11/1999 | Braiman et al. | | |
| 6,885,795 B1 * | 4/2005 | Hsu et al. | ......................... | 385/48 |
| 6,954,570 B2 * | 10/2005 | Hunt et al. | ....................... | 385/49 |
| 7,139,459 B2 * | 11/2006 | Kochergin et al. | ............ | 385/128 |
| 7,305,157 B2 * | 12/2007 | Ahn et al. | ......................... | 385/14 |
| 7,883,839 B2 * | 2/2011 | Donnelly et al. | ............. | 430/323 |
| 2002/0051607 A1 * | 5/2002 | Ido et al. | .......................... | 385/49 |
| 2002/0190623 A1 * | 12/2002 | Chen et al. | ..................... | 313/310 |
| 2003/0002795 A1 * | 1/2003 | Fisher et al. | ..................... | 385/37 |
| 2003/0012540 A1 * | 1/2003 | Kato et al. | ..................... | 385/130 |
| 2003/0081922 A1 * | 5/2003 | Ide | ................................. | 385/129 |
| 2003/0228104 A1 * | 12/2003 | Tabuchi | .......................... | 385/37 |
| 2004/0052461 A1 * | 3/2004 | Hunt et al. | ....................... | 385/43 |
| 2004/0114869 A1 * | 6/2004 | Fike et al. | ........................ | 385/43 |
| 2004/0188794 A1 | 9/2004 | Gothoskar et al. | | |

(Continued)

FOREIGN PATENT DOCUMENTS

JP          63131118 A *  6/1988    ............. G02B 26/08

OTHER PUBLICATIONS

Mathieu et al. "Integration of germanium waveguide photodetectors for optical intra-chip interconnects", Micro-Optics, VCSELs, and Photonic Interconnects, edited by Hugo Thienpont, Kent D. Choquette, Mohammad R. Taghizadeh, Proceedings of SPIE vol. 5453 (SPIE, Bellingham, WA, 2004) 1—Institut d'Electronique Fondamentale, CNRS UMR 8622, Universi.*

*Primary Examiner* — Kaveh Kianni
(74) *Attorney, Agent, or Firm* — Daniel J. Long

(57) ABSTRACT

A waveguide having a substrate, a first germanium sidewall and a second germanium sidewall. The waveguide is formed by growing the first germanium sidewall and second germanium sidewall on the substrate.

3 Claims, 4 Drawing Sheets

(56) References Cited

U.S. PATENT DOCUMENTS

| | | | |
|---|---|---|---|
| 2004/0251805 A1* | 12/2004 | Chen et al. | 313/311 |
| 2005/0001530 A1* | 1/2005 | Kuo et al. | 313/310 |
| 2005/0063634 A1* | 3/2005 | Cohen et al. | 385/14 |
| 2005/0276536 A1* | 12/2005 | Kochergin et al. | 385/14 |
| 2007/0104411 A1* | 5/2007 | Ahn et al. | 385/14 |
| 2009/0084995 A1* | 4/2009 | Cierullies et al. | 250/577 |
| 2009/0140168 A1* | 6/2009 | Goehde | 250/483.1 |
| 2010/0019166 A1* | 1/2010 | Kim et al. | 250/396 R |
| 2010/0132887 A2* | 6/2010 | Donnelly et al. | 156/345.24 |
| 2010/0322610 A1* | 12/2010 | Lusinchi | 396/89 |
| 2012/0230168 A1* | 9/2012 | Izawa et al. | 369/13.32 |
| 2013/0081447 A1* | 4/2013 | Carter et al. | 73/30.01 |

* cited by examiner

FACETED, GERMANIUM SLOTTED WAVEGUIDE

RELATED APPLICATIONS

This Application claims rights under 35 U.S.C. §119(e) from U.S. Application Ser. No. 61/544,335 filed Oct. 7, 2011, the contents of which are incorporated herein by reference.

TECHNICAL FIELD

Various embodiments described herein relate to semi-conductor manufacturing generally, including manufacturing of waveguides for integrated circuits.

BACKGROUND

Waveguides are devices that transmit optical signals from one location to another within an integrated circuit. Waveguides have been implemented in electronic-photonic integrated circuits to decrease circuit size and increase circuit performance. Present methods for manufacturing waveguides involve etching a slot within a silicon wafer. Etching the silicon substrate, however, is difficult to control. Due to present etching methods, the waveguide slot may vary in depth along the length of the waveguide. Moreover, etching may also create non-uniform sidewalls. These waveguide defects or geometric irregularities may cause dispersion of the optical mode. As a result of the present inaccurate waveguide manufacturing methods, waveguide performance and/or efficiency may be adversely affected.

SUMMARY

When germanium grows on a silicon substrate it forms angled-facets. Applying this to the manufacture of waveguides, germanium may be grown in defined areas of a substrate to create a waveguide. In the present disclosure these areas of growth are defined lithographically. The germanium that grows in these defined regions forms the sidewalls of a slotted waveguide.

The germanium sidewalls and the silicon substrate may define a slotted waveguide having a uniform geometry. Uniform geometry may include the waveguide having sidewalls with a constant slope. The sidewalls may also have a smooth surface finish as a result of the germanium crystalline structure. In the preferred embodiment of the disclosure germanium is grown to form the sidewalls of the waveguide. These sidewalls may be faceted having a constant angular slope and creating a slotted waveguide having a slot with a trapezoidal cross section. Uniform geometry may include a waveguide having a constant or non-varying depth.

In one embodiment of this disclosure, the oxide on the bottom of the slot may be removed. In another embodiment of this disclosure, the oxide at the bottom of the slot may be present. In the latter case, no etching of the oxide is required, so there is no surface roughness of the bottom of the slot due to etching.

BRIEF DESCRIPTION OF THE DRAWINGS

Other objects, features and advantages will occur to those skilled in the art from the following description and accompanying drawings, in which.

DETAILED DESCRIPTION

Figure 1:
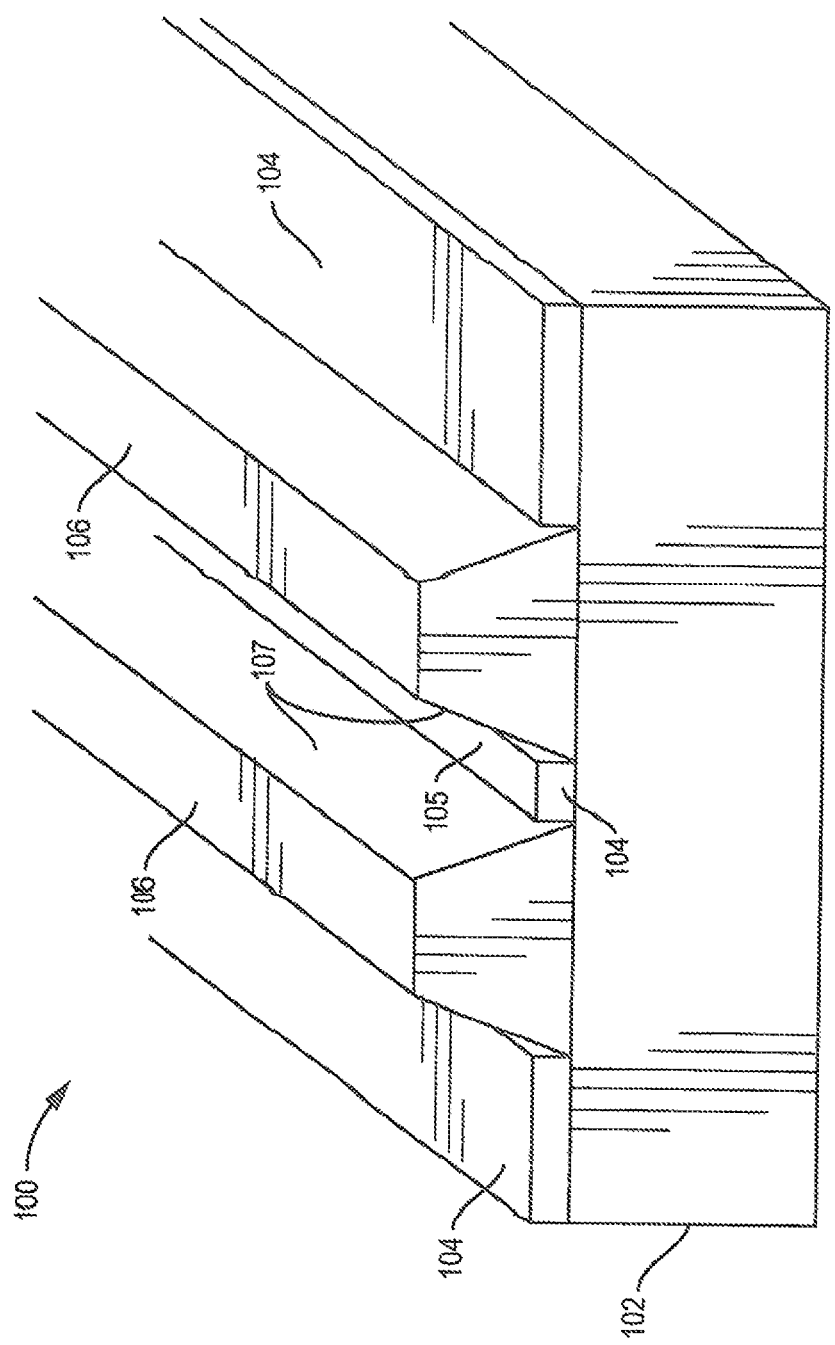
FIG. 1 is a perspective view of an exemplary embodiment of the waveguide of the present disclosure.

FIG. 1 is a perspective view of a waveguide 100 according to an exemplary embodiment of the present disclosure. The waveguide 100 having a uniform geometry may include but is not limited to a substrate 102, a protective layer 104, and a quantity of germanium sidewalls 106.

The substrate 102 supports the waveguide components. In the preferred embodiment of the present disclosure the substrate 102 is silicon. The substrate 102 supports the components that form the waveguide 100. Waveguide components may include a protective layer 104 and germanium sidewalls 106.

The protective layer 104 defines where germanium will not grow. Germanium will grow in regions where a protective layer of oxide is removed and the silicon substrate is thus exposed. Consequently, germanium can be grown on silicon to form the sidewalls of a slotted waveguide where the protective layer of oxide has been removed.

In one embodiment of this disclosure, the protective layer 104 having a top surface 105 and sidewalls 106 having an interior surface 107 define a slotted waveguide allowing optical signals to travel within the slot from one place to another. In this embodiment, the top surface 105 of the protective layer 104 defines the bottom surface of the slot within the waveguide 100. Since the top surface 105 of the protective layer 104 is not etched in this case, the top surface 105 is free of any roughness caused by the etching processes. The efficiency of the waveguide in transmitting an optical signal may be reduced if the bottom or sidewalls of the slotted waveguide are rough. Similarly, optical loss can occur if the sidewalls of the slot are rough. Sidewall roughness is reduced by growing the germanium sidewalls 106 to form interior surfaces 107 that define the waveguide slot, rather than etching a slot in the germanium.

In the preferred embodiment of the present disclosure the protective layer 104 is silicon dioxide because germanium does not grow on silicon dioxide. The protective layer 104 of oxide may be grown on the silicon substrate 102. Photoresist is applied to the oxide and patterned so that the photoresist material does not cover two strips of oxide. The protective layer of oxide in the regions which are not covered by the photoresist mask is then removed by etching. Germanium is then grown on the exposed regions of the silicon substrate 102 to create the germanium sidewalls 106 of the waveguide 100.

The region between the interior surfaces 107 of the germanium sidewalls 106 defines a slot allowing optical signals to travel from one place to another. Since the germanium is faceted, the germanium sidewalls 106 have a slope.

Germanium grows on silicon at a fixed angle depending on the orientation of the pattern of the protective layer 104 relative to the crystalline structure of the exposed silicon substrate 102. As a result, germanium sidewalls 106 have a faceted geometry and a constant slope. The germanium sidewalls 106 have a smooth surface finish as a result of germanium's crystalline structure. The germanium sidewalls 106 create a waveguide having a slot with a trapezoidal cross section.

The spacing or gap between the germanium sidewalls 106 defines the width of the waveguide slot. This spacing is defined lithographically and can be very small, so that the waveguide slot is very narrow. The desired spacing between the germanium sidewalls 106 may depend upon mode of the optical signal that is being transmitted through the waveguide slot.

In yet other embodiments of the present disclosure, the waveguide 100 may be included within integrated electrical circuits for transmitting optical signals from one location to another. These electrical circuits may be implemented in a variety of technology areas including, but not limited to aerospace and communication systems.

Figure 2:
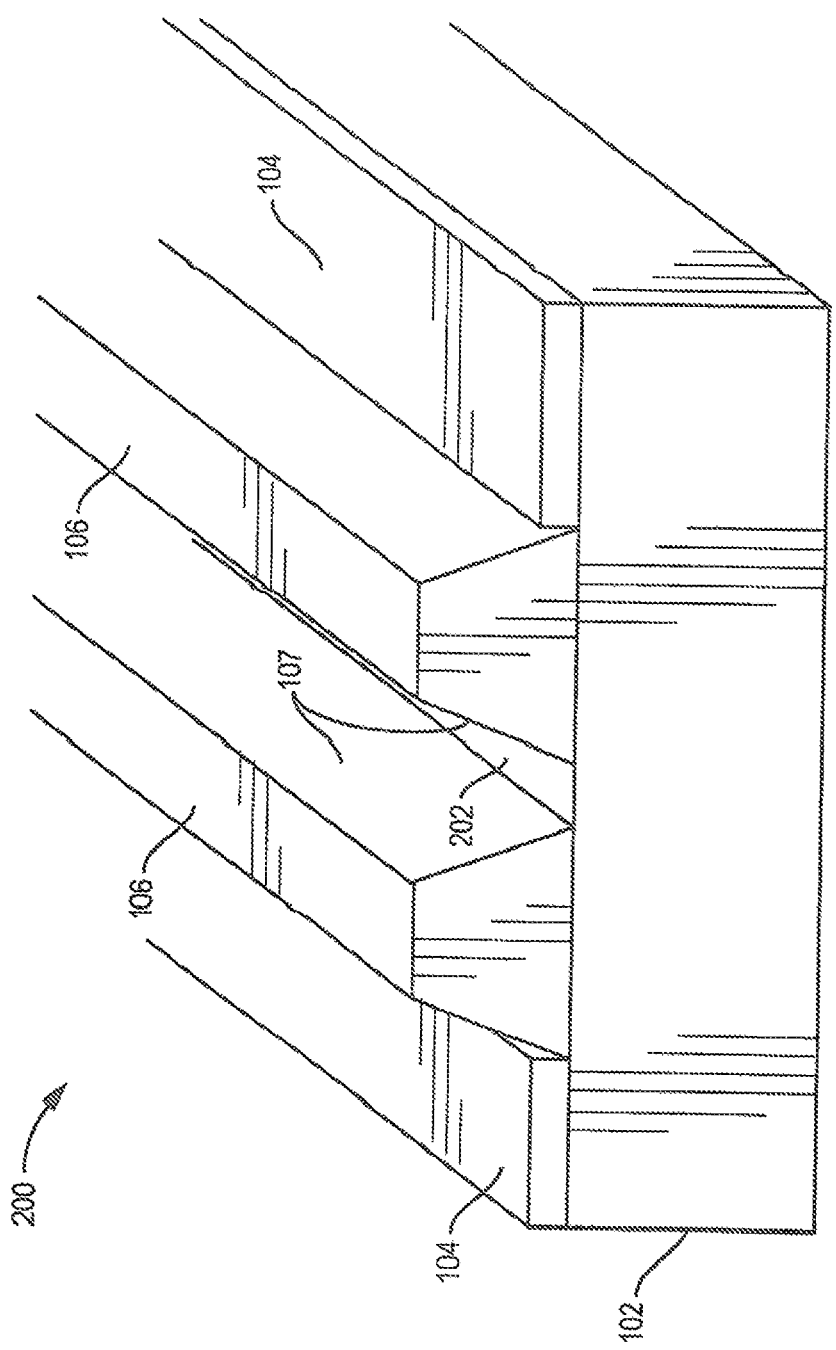
FIG. 2 is a perspective view of an exemplary embodiment of the waveguide of the present disclosure.

FIG. 2 is a perspective view of an alternate configuration of the waveguide 100 of FIG. 1 according to an example embodiment of the present disclosure. In this embodiment the waveguide 200 does not include the protective layer 104 located between the germanium sidewalls 106. The exposed surface 202 of the substrate 102 and the interior surfaces 107 of the germanium sidewalls 106 define a slotted waveguide 200 allowing optical signals to travel from one place to another. The waveguide 100 was previously described in relation with FIG. 1 of this disclosure.

In this embodiment, the substrate 102 defines the bottom surface of the waveguide 100. Silicon as the bottom of the waveguide may influence the transmission of an optical signal differently than oxide at the bottom of the waveguide.

Figure 3:
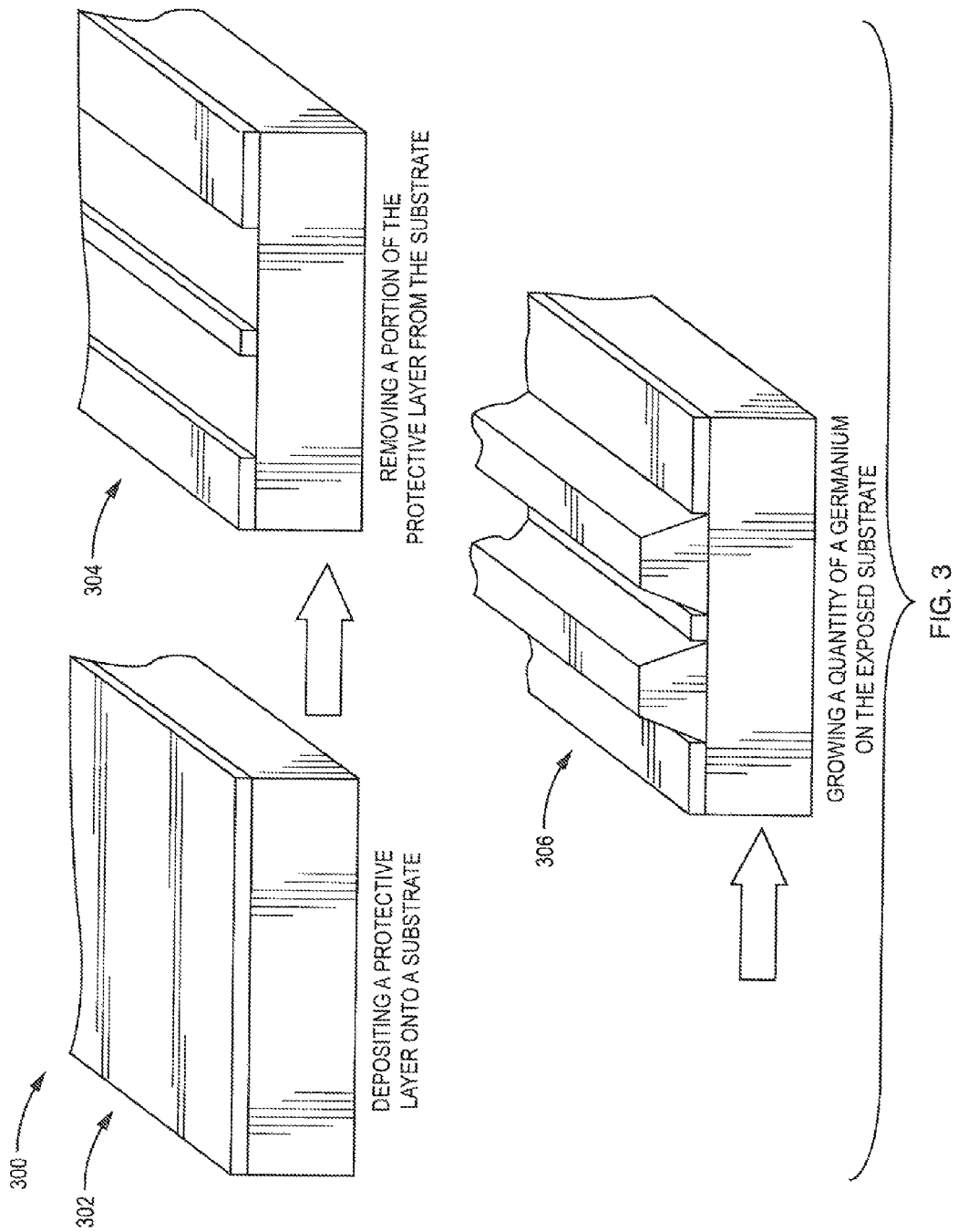
FIG. 3 is a flow diagram of a method for manufacturing a waveguide according to an example embodiment of the present disclosure.

FIG. 3 is a flow diagram for a method for manufacturing a waveguide 300 according to an example embodiment of the present disclosure. At block 302 a quantity of a protective layer is grown, or deposited, on a substrate. In the preferred embodiment of the present disclosure the protective layer may be a quantity of oxide that is grown on a silicon substrate.

At block 304 a quantity of the protective layer may be removed to expose a quantity of the substrate. The portion of the protective layer is removed to provide an exposed surface of the substrate for growing a quantity of germanium on the substrate. The protective layer may be removed from the substrate in bulk or selectively. Portions of the protective layer may be removed using any method capable of removing the protective layer from the substrate without damaging the substrate. Methods for removing the protective layer from the substrate may include but are not limited to: wet etching, dry etching or chemical etching. The exposed area of the substrate may be any shape capable of supporting waveguide function.

In the preferred embodiment of the present disclosure, a protective layer of oxide is grown on a silicon substrate. A photoresist may be applied to the oxide layer. After patterning and exposing the photoresist, the oxide not covered by the photoresist mask is etched down to the silicon substrate. The exposed portions of the oxide layer may be removed to expose a portion of the substrate using a etching process. This process leaves two closely spaced strips of silicon separated by a quantity of oxide. The two exposed strips of silicon substrate provide a location for the waveguide sidewalls.

At block 306 germanium is grown on the exposed areas of the substrate to form the waveguide sidewalls. In the preferred embodiment of the present invention a quantity of germanium may be grown on the two closely-space strips of the exposed substrate to form the sidewalls of the waveguide. The substrate may be initially preconditioned with a hydrogen gas. The temperature of the substrate may then be decreased, and germane gas may flow over the substrate to form an intrinsic germanium seed layer. Next, a mixture of germane and phosphine gases can be flowed over the intrinsic germanium seed layer to produce an n-doped germanium seed layer. Then a bulk germanium layer can be grown on top of the doped germanium seed layer. In yet other embodiments of the present disclosure, a mixture of diborane and germane gases can be flowed over the intrinsic germanium seed layer to produce a p-doped germanium seed layer.

Further teachings and descriptions of the methods for growing a quantity of germanium on a substrate are provided in the contents of U.S. Application Publication No. 2011/0036289 A1 filed Aug. 11, 2009, which is incorporated herein by reference. This reference and all other referenced patents and applications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Figure 4:
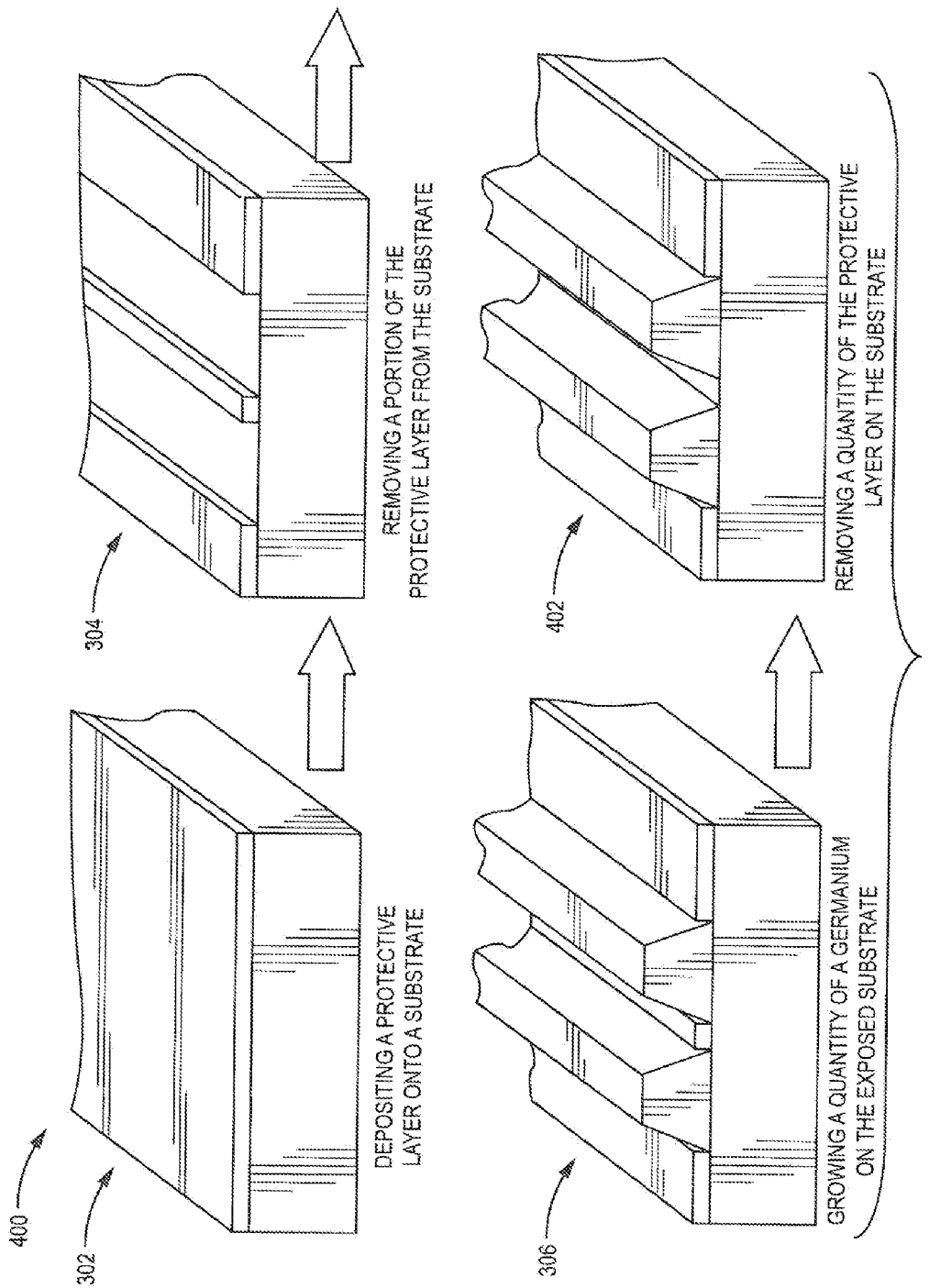
FIG. 4 is a flow diagram of method for manufacturing a waveguide according to an alternate embodiment of the present disclosure.

FIG. 4 is a flow diagram of an alternate method for manufacturing a waveguide 400 according to an example embodiment of the present disclosure. At block 402 the protective layer located between the waveguide sidewall may be removed from the substrate. Methods for removing the protective layer from the substrate may include but are not limited to wet etching, dry etching or chemical etching. The method steps for manufacturing a waveguide 300 were previously described in relation to FIG. 3 of this disclosure.

While the present disclosure has been described in connection with the preferred embodiments of the various figures, it is understood that other similar embodiments may be used or modifications or additions may be made to the described embodiments for performing the same function of the present disclosure without deviating therefrom. Therefore, the present disclosure should not be limited to any single embodiment, but rather construed in breadth and scope in accordance with the recitation of the appended claims.

It may be possible to execute the activities described herein in an order other than the order described. And, various activities described with respect to the methods identified herein can be executed in repetitive, serial, or parallel fashion.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims. Other embodiments will occur to those skilled in the art and are within the following claims.

What is claimed is:

1. A waveguide comprising:
   a substrate;
   a first germanium sidewall formed adjacent to the substrate, wherein the first germanium sidewall is formed by growing germanium on the substrate;
   a second germanium sidewall disposed onto the substrate, wherein the second germanium sidewall is formed by growing germanium on the substrate;
   a protective layer disposed onto the substrate between the first germanium sidewall and the second germanium sidewall, wherein the first germanium sidewall, the second germanium sidewall, the protective layer and the substrate form the waveguide; and
   a trapezoidal slot in the waveguide defined by the first germanium sidewall, the second germanium sidewall and the protective layer, wherein the trapezoidal slot is defined by an interior surface the first germanium sidewall grown on the substrate and an interior surface the second germanium sidewall grown on the substrate and an optical signal travels along the sidewalls within the trapezoidal slot.

2. The waveguide of claim 1 wherein the waveguide has at least one germanium sidewall having a constant angular slope.

3. The waveguide of claim 1 wherein the waveguide has a constant depth.

\* \* \* \* \*